(12) United States Patent
Robinault et al.

(10) Patent No.: US 10,260,659 B2
(45) Date of Patent: Apr. 16, 2019

(54) METHOD FOR FASTENING A CONDUIT ON A SUPPORT BY MEANS OF FREELY ADJUSTABLE CAPTIVE FLANGES

(71) Applicant: AVON POLYMERES FRANCE SAS, Vannes (FR)

(72) Inventors: Michel Robinault, Sene (FR); David Gateau, Locmaria Grand Champ (FR)

(73) Assignee: AVON POLYMERES FRANCE SAS, Vannes (FR)

(*) Notice: Subject to any disclaimer, the term of this patent is extended or adjusted under 35 U.S.C. 154(b) by 3 days.

(21) Appl. No.: 15/730,526

(22) Filed: Oct. 11, 2017

(65) Prior Publication Data

US 2018/0100605 A1 Apr. 12, 2018

(30) Foreign Application Priority Data

Oct. 11, 2016 (FR) ..................................... 16 59800

(51) Int. Cl.
| | | |
|---|---|---|
| *F16L 3/24* | (2006.01) | |
| *F16L 3/14* | (2006.01) | |
| *F16L 3/12* | (2006.01) | |
| *F16L 3/123* | (2006.01) | |
| *F02M 35/10* | (2006.01) | |

(52) U.S. Cl.
CPC ...... *F16L 3/14* (2013.01); *F16L 3/12* (2013.01); *F16L 3/123* (2013.01); *F16L 3/1236* (2013.01); *F02M 35/10144* (2013.01)

(58) Field of Classification Search
CPC .............. F16L 3/14; F16L 3/12; F16L 3/123; F16L 3/1236
USPC ........................................ 248/72, 74.1, 74.2
See application file for complete search history.

(56) References Cited

U.S. PATENT DOCUMENTS

| | | | | |
|---|---|---|---|---|
| 4,195,855 A | * | 4/1980 | van Haren | ............. F16J 15/127 |
| | | | | 277/608 |
| 2017/0089491 A1 | * | 3/2017 | Kito | ...................... F16L 55/035 |

FOREIGN PATENT DOCUMENTS

| | | | | |
|---|---|---|---|---|
| EP | 3 029 364 A1 | 6/2016 | | |
| EP | 3029364 A1 | * | 6/2016 | ....... F02M 35/10144 |
| FR | 1 596 785 A | 6/1970 | | |
| GB | 2 447 489 A | 9/2008 | | |
| JP | S56-3374 A | 1/1981 | | |

OTHER PUBLICATIONS

May 31, 2017 Search Report issued in French Patent Application No. 1659800.

* cited by examiner

*Primary Examiner* — Todd M Epps
(74) *Attorney, Agent, or Firm* — Oliff PLC (57) ABSTRACT

A fastening method configured to fasten a mechanical part on a support by means of a fastening flange, the method including: placing the fastening flange on a first segment of the part, in a loose configuration, providing on the first segment at least one stop and on the fastening flange at least one bearing member, which cooperates with the stop so as to limit, in the loose configuration, the stroke of the fastening flange to a predetermined allowed displacement range, which allows to freely select an adapted position among a plurality of accessible positions, and to provide on the flange a locking mechanism arranged such that, when the subassembly is fastened to the support by means of the at least one lug, then a locking of the body of the fastening flange is automatically caused on the mechanical part in the adapted position.

11 Claims, 3 Drawing Sheets

METHOD FOR FASTENING A CONDUIT ON A SUPPORT BY MEANS OF FREELY ADJUSTABLE CAPTIVE FLANGES

TECHNICAL FIELD OF THE INVENTION

The present invention concerns the fastening of a mechanical member, such as a conduit used for a fluid transfer, on a support, such as a vehicle engine or chassis.

STATE OF THE ART

It is known to fasten conduits on engine or chassis elements by means of lugs, which support the conduit and which are fastened by screwing on the engine or the chassis. According to a known arrangement, the lugs may be formed of rigid plastic, and for example molded in one piece with the conduit, overmolded on said conduit, or fastened on the conduit by welding.

The drawback of such an arrangement is that the lugs are rigidly connected to the conduit, and therefore may not be adjusted as a function of the manufacturing and assembly tolerances. Furthermore, such a rigid junction facilitates the transmission of the vibrations.

Another known arrangement consists in providing a flange, distinct from the conduit, and which comprises, on the one hand, a body fitted with an elastomer pad, forming a ring portion which is engaged on the conduit and, on the other hand, two fastening lugs which each extend at an end of the body, and which are configured to be fastened on the support.

An advantage of this arrangement is that the presence of an elastomer pad allows damping the vibrations.

However, one drawback of such an arrangement lies in the fact that, in order to prevent the flange from being lost by sliding and falling from the conduit, the body of the flange and the elastomer pad must be dimensioned so that the elastomer pad exerts a tightening on the conduit as soon as the flange is placed on said conduit.

In practice, here again, and because of the high friction that the elastomer exerts against the conduit, it is not possible to adjust the position of the flange relative to the conduit, after having placed the flange on the conduit, without to risking to damage, and in particular to rip off or tear, the elastomer pad, or even to damage the conduit.

It is therefore necessary to directly position the flange with accuracy in the final position thereof on the conduit by means of a specific tool, of the clamp type, which temporarily forces the elastic opening of said flange to allow its engagement on the conduit, until the flange reaches the desired position.

Furthermore, the manufacture of such flanges constituted of several components, which comprise at least one elastomer pad carried by at least one body made of a more rigid, generally metal, material, may be relatively complex and expensive.

BRIEF SUMMARY OF THE INVENTION

Consequently, the objects assigned to the invention aim to overcome the aforementioned drawbacks and to propose a new method of fastening a mechanical part on a support which is capable of being adapted to a wide variety of fastening conditions, and in particular which allows compensating a wide variety of manufacturing tolerances, while being particularly simple, rapid and cost-effective to implement.

The objects assigned to the invention are achieved by means of a fastening method configured to fasten a mechanical part, such as a conduit, on a support, such as a vehicle engine or chassis, by means of fastening flange which comprises a body configured to receive and hold the mechanical part, as well as at least one lug supporting the body and configured to be fastened on the support, said method being characterized in that it comprises a step a) of preparing a subassembly including at least one mechanical part and at least one fastening flange, where said step (a) includes:

placing the fastening flange on a first segment of the mechanical part which extends along a central axis (XX'), in a configuration called <<loose configuration>> in which, on the one hand, the flange is captive of the mechanical part and, on the other hand, a play exists between the body of the fastening flange and the first segment so that said flange may be displaced in at least one degree of freedom relative to the first segment, in rotation about the central axis (XX') and/or in translation along said central axis (XX'), providing on the first segment at least one stop, and on the fastening flange at least one bearing member, designed to cooperate with the stop so as to limit, in a loose configuration, the stroke of the fastening flange relative to the first segment, in the at least one degree of freedom, to a predetermined allowed displacement range which allows freely selecting a position of the flange relative to the first segment, called <<adapted position>> among a plurality of accessible positions, and providing on the flange a locking mechanism arranged such that, if, subsequently to the preparation step (a), the subassembly is fastened to the support by means of the at least one lug of the fastening flange, after having positioned the fastening flange in the adapted position, then the action of fastening the at least one lug to the support automatically causes a locking of the body of the fastening flange on the mechanical part, in a configuration called <<tight configuration>> in which said fastening flange is immobilized on the first segment in the selected adapted position and in that a first stop and a second stop are each formed by an annular rib, or an annular rib portion, which protrudes radially towards the outside of the first segment, substantially in a plane normal to the central axis, so that, on the one hand, to limit the translation of the flange along the central axis and, on the other hand, to guide the rotation of the flange about said central axis, and in that at least one of the first and second annular stops is interrupted on an angular sector which defines the displacement range which is allowed in rotation of the flange about the central axis, and in that the body of the flange comprises a bearing member formed by a finger which protrudes axially inside said angular sector.

Advantageously, the invention allows pre-constituting a complete subassembly which comprises the mechanical part (the conduit) and the number of fastening flanges necessary for the fastening of said part, pre-positioned in the vicinity of their adapted position, so that it is no longer necessary to provide additional flanges in order to mount said subassembly on the support.

The subassembly may therefore be easily prepared separately from the support, on a first assembly line, before being transported to a second assembly line distant from the first one, in order to be assembled there on the support.

Furthermore, each flange is captive of an allowed displacement range which is, on the one hand, sufficiently narrow to pre-position said flange, relative to the mechanical part (conduit), in the vicinity of the adapted (future) position, that is to say in an area which will substantially correspond to the final position (adapted position) to be adopted by said flange when fastening to the support and, on the other hand, sufficiently large so that the flange may be freely and automatically repositioned relative to the part in order to accommodate, without force, the assembly tolerances, at the moment when the lug of the flange is placed against the support in order to carry out the fastening of said flange on said support.

Advantageously, pre-positioning and maintaining the flanges in the respective displacement ranges thereof, thanks to the stop and bearing member system specific to the invention, facilitates the subsequent mounting of the subassembly on the support, since the flanges are already in the immediate vicinity of their final position (adapted position), while nevertheless preserving the necessary and sufficient displacement capacity, within their displacement range, in order to accommodate, in rotation and/or in translation, the variations in the assembly configuration which are induced by the manufacturing tolerances of the support and/or the subassembly.

The same type of standard sub-assembly, produced in a reproducible and simple manner, might thus be adapted, in a polyvalent manner, to a whole series of supports, within a predictable tolerance range.

Furthermore, the locking mechanism according to the invention will automatically and directly lock the flange on the mechanical part at the moment when the fastening of the subassembly on the support is carried out.

Thanks to the invention, the mere fact of positioning the subassembly relative to the support, and more particularly of placing the lugs in contact with the support, as long as the flange is in a loose configuration, causes the flange to be positioned and oriented spontaneously in an adapted position, which compensates the possible manufacturing tolerances.

Then, the simple fact of fastening, typically screwing, the lugs on the support allows to block automatically the flange exactly in said adapted position, that said flange has spontaneously adopted between the support and the part, and which is therefore exactly suitable for the particular configuration of the considered mounting.

BRIEF DESCRIPTION OF THE FIGURES OF THE INVENTION

Other objects, features and advantages of the invention will appear in more detail upon reading the following description, as well as using the appended drawings, given by a non-limiting and purely illustrative way, among which.

DETAILED DESCRIPTION OF THE INVENTION

Figure 9:
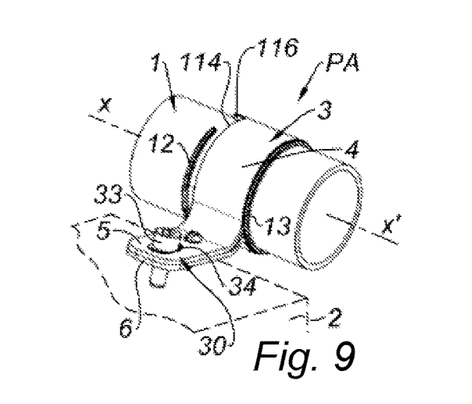
FIG. 9 illustrates, in a perspective view, the subassembly of FIGS. 1 to 8, in a tight configuration, the fastening lugs being screwed together on the support.

The present invention concerns a fastening method configured to fasten a mechanical part 1, such as a conduit 1, on a support 2, such as a vehicle engine or chassis, by means of a fastening flange 3, as illustrated in FIG. 9.

In the following, and for convenience of description, the mechanical part 1 might be assimilated to a conduit, configured to convey any fluid, and more particularly to a conduit configured to convey a fluid called «automotive» fluid such as, for example, a fuel, air, in particular intake air configured to form an oxidizer within a combustion engine, a gas, a mixture of gas or of liquid and gas, in particular exhaust gases, vapor, in particular an oil vapor, a brake liquid, a coolant, an urea solution for the catalytic depollution of the exhaust gases, a washing solution for windshield washer, etc.

Said part 1 is preferably made of a polymer material, preferably rigid, and for example made of a thermoplastic polymer such as: polyamide (PA), polybutylene terephthalate (PBT), thermoplastic polyester and elastomer co-polymer (TPC-ET), Polypropylene (PP), polypropylene and ethylene-propylene-diene-monomer copolymer (PP-EPDM), polyphthalamide (PPA), polyphenylene sulfide (PPS).

Said thermoplastic polymer might, if necessary, be loaded with reinforcing fibers, in particular glass fibers.

The fastening flange 3, (hereinafter "flange") comprises a body 4 configured to receive and hold the mechanical part 1, as well as at least one lug 5, 6 which supports the body 4 and which is configured to be fastened on the support 2.

Preferably, the flange 3 comprises a first lug 5 and a second lug 6 which form each one of the two ends of the same flexible strip forming the body 4.

Thus, in a manner known per se, the flange 3 may be opened by moving the first and second lugs 5, 6 apart and, on the contrary, the flange 3 may be closed and tightened on the part 1 by bringing said lugs 5, 6 together.

The strip forming the body 4 is preferably preformed in an arch-like shape, of a shape substantially mating the shape of the part 1 to which the body 4 must conform.

Figure 1:
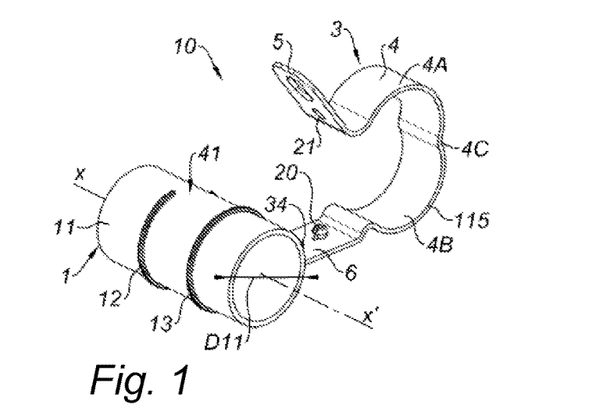
FIG. 1 illustrates, in an exploded front perspective view, a second variant of a subassembly according to the invention.

More particularly, and as well visible in FIG. 1, said strip may comprise two arcuate jaws 4A, 4B, each connected to a lug 5, 6, and connected to each other by a zone of articulation 4C, forming a hinge or a fold.

Thereby, at rest, and before being placed on the mechanical part 1, the flange 3 is wide open, the jaws 4A, 4B being sufficiently moved apart in order to allow the insertion of the part 1 in the flange 3, between the jaws 4A, 4B, by lateral approach, that is to say in a direction transverse, or even substantially perpendicular, to the central axis (XX') of the part 1, and transverse, or even substantially perpendicular, to the central axis of the flange 3.

The flange 3 may then be closed around the part 1 by forcing the lugs 5, 6 to be mutually brought together, and thus the jaws 4A, 4B secured to said lugs 5, 6, here against an elastic deformation (in flexion) of the zone of articulation 4C.

The body 4 of the flange 3, and more particularly the jaws 4A, 4B and the zone of articulation 4C, will be made, preferably in one piece with the lugs 5, 6, of a semi-rigid material which is, on the one hand, sufficiently rigid to allow an effective tightening of the flange 3 by constriction on the mechanical part 1 and, on the other hand, sufficiently flexible to allow the elastic flexion necessary to open the flange 3 and engage said flange 3 on the part 1, and then to tighten the flange 3 on said part 1.

Preferably, the body 4 of the flange 3, and more particularly the jaws 4A, 4B and the zone of articulation 4C will be made, preferably in one piece with the lugs 5, 6, of a thermoplastic polymer material, such as polyamide (PA), polybutylene terephthalate (PBT), thermoplastic polyester and elastomer co-polymer (TPC-ET), Polypropylene (PP), polypropylene and ethylene-propylene-diene-monomer copolymer (PP-EPDM), polyphthalamide (PPA), polyphenylene sulfide (PPS).

Said thermoplastic polymer might, if necessary, be loaded with reinforcing fibers, in particular glass fibers.

Such a polymer material advantageously allows to easily manufacture a light and inexpensive flange 3, preferably by injection molding.

According to the invention, the method comprises a step (a) of preparing a subassembly 10 which includes at least one mechanical part 1, here preferably a conduit, and at least one fastening flange 3.

Said step (a) of preparing a subassembly 10 includes placing the fastening flange 3 on a first segment 11 of the mechanical part 1 which extends along a central axis (XX'), in a configuration called «loose configuration», in which on the one hand, the flange is captive of the mechanical part 1 and on the other hand, a play (and more particularly a radial play) JR exists between the body 4 of the fastening flange 3 and the first segment 11 of the part 1 so that said flange 3 may be displaced in at least one degree of freedom relative to the first segment 11, in rotation about the central axis (XX') and/or in translation along said central axis (XX'), More particularly, the two jaws 4A, 4B, and the lugs 5, 6 will be partially closed on the conduit 1, and held together in a position sufficiently close to one another in order to prevent the conduit 1 from being extracted radially from the flange 3, while being not tightened on the conduit, such that the flange 3 is loose.

It will be noted that the central axis (XX') corresponds to the mean line of the first segment 11 of the part 1, in the beam theory meaning, that is to say to the line formed by the set of centers of gravity of each of the successive straight sections of said first segment 11.

Preferably, the first segment will form a cylinder, and more particularly a hollow cylindrical segment, centered on the central axis (XX'), and whose cross-section is substantially circular.

Thus, the side wall of the first segment 11, as well as the body 4 of the flange which surrounds said side wall of the first segment and which is therefore substantially coaxial with said first segment 11, will surround and envelop the central axis (XX').

For convenience of description, the term «axial» means a direction or a dimension considered parallel to the central axis (XX'), and the term «radial» means a direction or a dimension perpendicular to said central axis (XX').

Preferably, the first segment 11, and therefore the central axis (XX'), is substantially rectilinear.

Preferably, the loose configuration allows both a free adjustment in (azimuthal) rotation of the flange 3 about the central axis (XX') and a free adjustment in axial translation of the flange 3 along the central axis (XX'), and more generally any adjustment corresponding to any combination of these two rotational and translational components.

According to the invention, the step (a) of preparing a subassembly 10 also includes providing on the first segment 11 at least one stop 12, 13 and on the fastening flange 3 at least one bearing member 114, 115, 116, 117 designed to cooperate with the stop 12, 13 so as to limit, in the loose configuration, the stroke of the fastening flange 3 relative to the first segment 11, in the at least one degree of freedom, to a predetermined allowed displacement range T3, R3 which allows to freely select a position of the flange 3 relative to the first segment 11, called <<adapted position>> PA, among a plurality of accessible positions.

It will be noted T3 the displacement range allowed in translation along the central axis (XX'), and R3 the displacement range allowed in rotation about the central axis (XX').

Advantageously, the at least one stop 12, 13 and the at least one corresponding bearing member 114, 115, 116, 117 are arranged, on the one hand, to form stroke limiting members which make the flange 3 captive of a limited allowed displacement range T3, R3 which covers only a portion of the mechanical part 1, and which is therefore sufficiently restricted so that said flange 3, once captive of the first segment 11 in a loose configuration, is prepositioned in the vicinity of what will become the final position thereof after the fastening on the support 2 (that is to say in the vicinity of what will be the adapted position PA thereof) and, on the other hand, sufficiently large to allow all the necessary adjustments in translation and/or in rotation to compensate the manufacturing tolerances and the predictable mounting plays between the subassembly 10 and the support 2.

Preferably, in the loose configuration, the flange 3 has, for this purpose, a displacement range allowed in rotation R3 about the central axis (XX'), that is to say, allows a rotational stroke of the flange 3 about the central axis (XX'), which is greater than or equal to 2 degrees, or even preferably greater than or equal to 5 degrees and, moreover, less than or equal to 90 degrees, less than or equal to 60 degrees, or even preferably less than or equal to 30 degrees.

Similarly, in an alternative manner or, preferably, in a complementary manner, in a loose configuration, the flange 3 has a displacement range allowed in translation T3 along the central axis (XX'), that is to say allows a stroke in translation parallel to the central axis (XX'), which is greater than or equal to 2 mm and, moreover, less than or equal to 50 mm, and even preferably less than or equal to 20 mm.

Preferably, the flange 3, and more particularly the body 4 of said flange, as well as the first segment 11 of the mechanical part 1 are arranged to allow a continuous adjustment in all the allowed displacement range(s) R3, T3, that is to say that any position of the flange 3 may be freely selected relative to the first segment 11 in the considered range R3, T3, without having to respect a finite number of notches or a predetermined increment pitch between two successive positions.

Preferably, the inner (concave) face of the body 4 of the flange 3, as well as the outer (convex) face of the first segment 11 on which bears, here in direct contact, said body 4, are smooth, so as to allow a sliding of the flange 3 relative to the part 1, within the limits fixed by the allowed displacement ranges R3, T3 defined by the stops 12, 13 and the associated bearing members 114, 115, 116, 117.

In order to place and maintain the flange 3 in a loose configuration about the part 1, and thus make the flange 3 captive of the part 1 and engage the cooperation between the stops 12, 13 and the bearing members 114, 115, 116, 117, the flange 3, and more particularly the first and second lugs 5, 6 will preferably comprise pre-holding members 20, 21.

These pre-holding members 20, 21 allow bringing the first lug and the second lug 5, 6 together (and thus bringing the jaws 4A, 4B together) and to bind the first lug 5 to the second lug 6, in a first degree of closure which corresponds to the loose configuration.

In this first degree of closure, illustrated in particular in FIGS. 3, 5 to 8, said pre-holding members 20, 21 maintain the lugs 5, 6 in a position where they are close to each other, so that said lugs and the body 4 form together a closed ring about the first segment 11 and the central axis (XX').

Particularly preferably, the pre-holding members 20, 21 will form snap-fit members 20, 21, which cooperate by elastic clipping and provide a non-return effect which, once the first degree of closure is engaged, prevents the separation of the lugs 5, 6 and thus the return of the flange 3 to an open state.

Thus, the engagement of the snap-fit members 20, 21 ensures automatically the maintaining of the flange 3 in its loose closed configuration.

For convenience of description, the pre-holding members 20, 21 might thus be assimilated in the following to snap-fit members 20, 21.

As illustrated in particular in FIG. 1, said snap-fit members 20, 21 may comprise, on the one hand, an elastic hook 20 formed, here in a non-limiting manner, by a shouldered split pin 20, attached to the second lug 6, and preferably formed in one piece with said second lug 6 and, on the other hand, a gripping surface 21, here formed by the rim of a hole 21 pierced in the first lug 5 opposite the hook 20.

Figure 4:
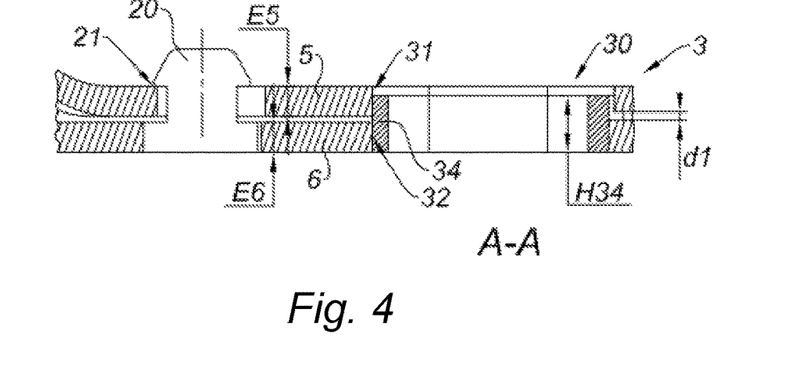
FIG. 4 in a sectional detail view, on the one hand the snap-fit members which allow maintaining the flange in a first degree of closure which corresponds to the loose configuration and on the other hand the pending locking mechanism, which allows to subsequently switch the flange into a tight configuration.
Figure 5:
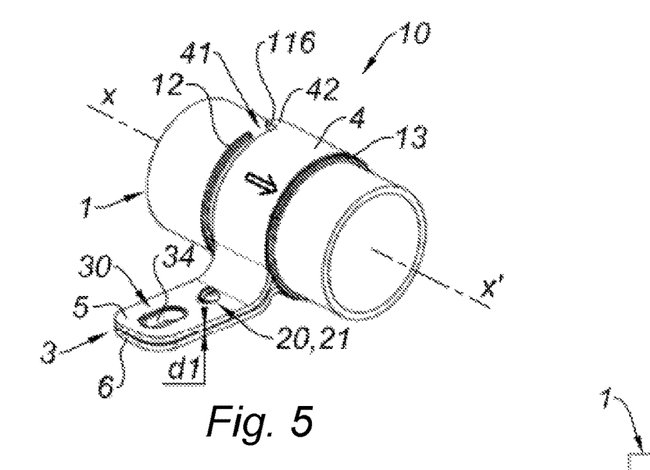
FIGS. 5 and 6 illustrate, respectively in a perspective view and a top projection view, an axial translational displacement of the flange of the subassembly of FIGS. 1 to 3, in a loose configuration, in an allowed translation range.
Figure 6:
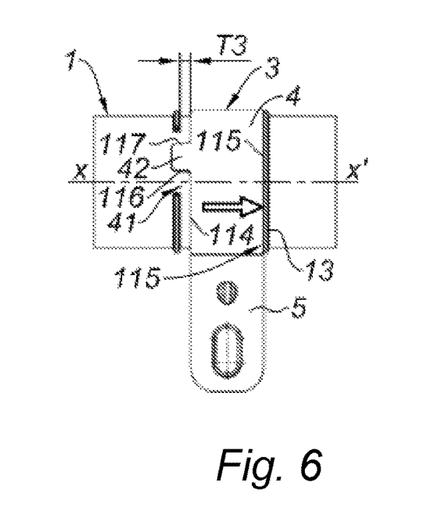
Figure 7:
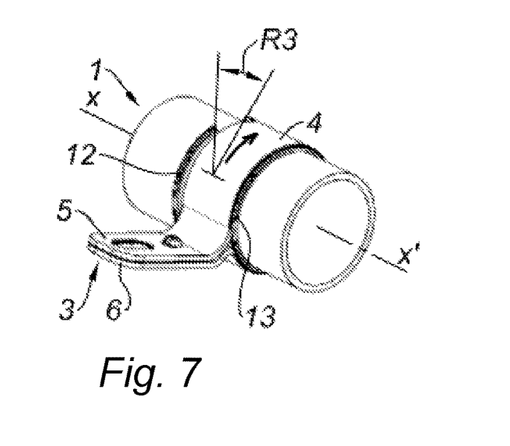
FIGS. 7 and 8 illustrate, respectively in a perspective view and a top projection view, a rotational displacement of the flange of the subassembly of FIGS. 1 to 6, in a loose configuration, in an allowed rotation range.

Preferably, as shown in FIG. 4, in a loose configuration, and more particularly at the first degree of closure of the flange 3, a residual distance d1 remains between the lugs 5, 6 which are elastically returned in the direction of their spacing by the elasticity of the body 4 of the flange 3, and more particularly by the elasticity of the zone of articulation 4C.

This residual spacing d1 defines, in turn, the radial play JR which separates, perpendicularly to the central axis (XX'), the outer face of the first segment 11 from the inner face of the body 4 of the flange 3.

By way of indication, said radial play JR is substantially comprised between 0.5 mm and 3 mm, and even preferably comprised between 0.5 mm and 1.5 mm, and for example in the order of 1 mm, which allows simultaneously, a freedom of movement of the flange 3 relative to the part 1 in the displacement range(s) R3, T3, and a (relatively accurate) guidance of said movements of the flange around and/or along the part 1.

By way of indication, the residual spacing d1 (in the loose configuration) will be preferably substantially comprised between 0.5 mm and 3 mm, and even more preferably substantially between 1 mm and 2 mm.

Preferably, the stops 12, 13 which guide and limit the stroke of the flange 3 relative to the part 1, within the first segment 11, will form elements, and in particular radially protruding reliefs, which are specific and in particular distinct from the possible elbows of the part 1.

Thus, in particular, if the part has a first rectilinear segment 11 and of a substantially constant outer diameter D11, which extends over a given length, said stops 12, 13 will allow limiting, within this first segment 11, an allowed displacement range R3, T3 which is more restricted axially in length than said first rectilinear segment 11, that is to say less than the given length (but nonetheless covers, axially, all the predictable adapted positions PA).

Figure 8:
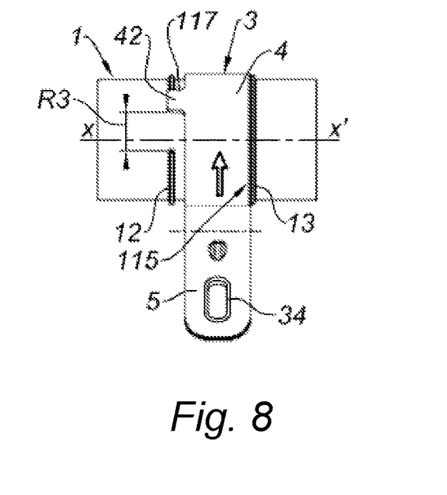
Figure 10:
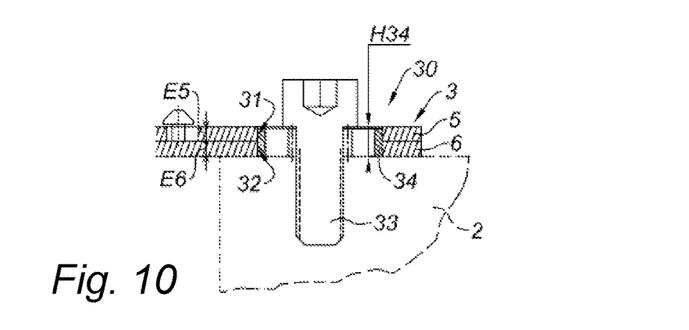
FIG. 10 illustrates, in a sectional detail view, the implementation of the locking mechanism which, simultaneously with the fastening of the lugs to the support, causes the tightening of the flange, and the immobilization of said flange on the conduit.

According to the invention, step (a) of preparing a subassembly 10 also includes providing on the flange 3 a locking mechanism 30 arranged such that, if, subsequently to the preparation step (a), the subassembly 10 is fastened to the support 2 by means of the at least one lug 5,6 of the fastening flange 3, after having positioned the fastening flange 3 in the adapted position PA, then the action of fastening the at least one lug 5, 6 to the support 2 automatically causes a locking of the body 4 of the fastening flange on the mechanical part 1, in a configuration called <<tight configuration>> in which said fastening flange is immobilized on the first segment 11 in the selected adapted position PA, as illustrated in FIGS. 10 and 8.

In other words, the flange 3 is provided with a locking mechanism 30 which automatically triggers the locking of said flange 3 on the mechanical part 1, by removing (reducing to zero) the radial play JR in order to tighten the body 4 against the first segment 11, as soon as fastening, for example as soon as screwing, the lug(s) 5, 6 on the support 2.

Thus, the invention allows to proceed, all the way, that is to say as long as the lug 5, 6 is not totally fastened to the support 2, to ultimate adjustments, and even to a self-adjustment, of the position of the flange 3 in situ, when the subassembly is in place relative to the support 2, then to definitely lock the flange 3 on the part 1 in the "right" adapted position, at the exact moment the lug 5, 6 is fastened and blocked on the support 2.

Of course, the method according to the invention preferably includes, subsequently to the preparation step (a) of a subassembly 10 including at least one mechanical part 1 and at least one fastening flange 3, a mounting step (b), during which said subassembly 10 is positioned relative to the support 2, the position of the flange 3 is adjusted to reach the adapted position PA, then the at least one lug 5, 6 of the flange is fastened on the support 2, so as to simultaneously fasten the subassembly 10 to the support 2 and lock the flange 3 on the first segment 11 of the mechanical part 1 of said subassembly 10, as illustrated in FIGS. 10 and 18.

The fastening of the at least one lug 5, 6 to the support 2 might be done by means of any appropriate fastening element 33, and preferably by screwing, by means of a threaded fastening element 33 formed by a screw (FIGS. 10, and 18), a bolt or stud, or by riveting.

It will be noted that the mounting step (b) may advantageously occur on an assembly line distinct and distant from the assembly line on which the preparation step (a) of the subassembly is carried out.

Thus, the subassembly 10 may be prepared by a subcontractor, then delivered, in a preassembled state in a loose configuration, with the mechanical part 1 thereof and the set of the necessary captive flanges 3 of said part 1 and prepositioned on said part 1, to a manufacturer who might then incorporate said subassembly 10 into a vehicle and fasten said subassembly to the support 2 by passing each flange 3 in its tight configuration, while the flanges 3 are automatically placed in their adapted position PA.

Eventually, the subassembly 10, and more particularly the flange 3 according to the invention, has therefore two degrees of closure, namely a first degree of closure corresponding to the loose configuration, procured for example by the aforementioned snap-fit members 20, 21, and in which the body 4 has a first inner diameter strictly greater than the outer diameter D11 of the first segment 11, and a second degree of closure, subsequently procured, during the mounting on the support 2, by the locking mechanism 30, and corresponding to the tight configuration, and in which the inner diameter of the body 4 is reduced to tightly adjust said body 4 on the first segment 11.

More preferably, and as illustrated in FIGS. 1, 4 and 10, the flange 3 includes a first lug 5 and a second lug 6 which include, on the one hand, pre-holding members 20, 21 formed preferably by snap-fit members 20, 21, as described above, which allow bringing the first lug 5 and the second lug 6 together (here substantially diametrically opposite the zone of articulation 4C relative to the first central axis (XX')) in a first degree of closure which corresponds to the loose configuration (FIGS. 4 and 5) and, on the other hand, a locking mechanism 30 which includes a first through hole 31 in the first lug 5 and a second through hole 32 in the second lug 6, said through holes 31, 32 being superimposed in order to allow the passage of a fastening element 33, such as a screw, a stud or a rivet, during the fastening of said lugs 5, 6 on the support 2 such that, when the fastening element 33 is tightened against the support 2, the first lug 5 is automatically brought (further) closer to the second lug 6 in a second degree of closure which corresponds to the tight configuration (FIGS. 10 and 8).

According to a possible implementation, it may be expected that, in the second degree of closure, that is to say in the tight configuration, there remains a residual (non-zero) spacing between the first lug 5 and the second lug 6, so that said lugs 5, 6, although closer to each other than in the loose configuration, are not juxtaposed in a flattened manner against each other.

However, preferably, and according to another particularly convenient possible implementation, in the second degree of closure, that is to say in the tight configuration, the first lug 5 bears in contact with the second lug 6, here by being juxtaposed in a flattened manner against said second lug 6, as clearly shown in FIG. 10, so as to reduce the residual spacing d1 to zero and, concomitantly, reduce the radial play JR to zero, so as to obtain a tightening of the body 4 of the flange 3 on the part 1.

Thus the locking of the flange 3 on the part 1 occurs when switching from the first degree of closure, in which the first lug 5 is separated from the second lug 6 by the selected value of the residual spacing d1, such that said residual spacing d1 is defined by the snap-fit members 20, 21, to the second degree of closure, in which the first lug 5 abuts against the second lug 6, that is to say when the flange is tightened by an increment which is equal to the value of the residual spacing d1.

Therefore, this type of locking allows advantageously to control, precisely and reproducibly, the intensity with which the flange 3 is tightened on the part 1, simply by selecting, here by an adapted arrangement of the snap-fit members 20, 21, an appropriate residual spacing value d1.

Moreover, the use of simple through holes 31, 32 in the lugs 5, 6 as a locking mechanism 30 allows producing a particularly simple and lightweight flange 3.

In order to facilitate the adaptation of the flange 3 to the support 2, the through holes 31, 32 are preferably oblong.

Moreover, it will be noted that the locking mechanism 30, as well as the snap-fit members 20, 21, may be the same regardless of the variant of arrangement of the stops 12, 13 and of the bearing members 114, 115, 116, 117 used by the flange 3.

Preferably, it will be also noted that the snap-fit members 20, 21 are located, on the lugs 5, 6, radially closer to the central axis (XX') and therefore closer to the mechanical part 1, than the locking mechanism 30, and more particularly than the through holes 31, 32, radially farther from the central axis (XX').

More generally, regardless of the shape and the orientation of the lugs 5, 6, the locking mechanism 30 might be, along the lugs 5, 6, farther from the body 4 of the flange and the jaws 4A, 4B than the snap-fit members 20, 21 are. In other words, the locking mechanism 30 might be located closer to the free end of the lugs 5, 6 than the snap-fit members 20, 21, the latter being then closer to the roots of the lugs 5, 6, through which said lugs are attached to the body 4 and to their respective jaws 4A, 4B.

Such an arrangement allows in particular to accurately control the first degree of closure, and consequently the radial play JR and thus to ensure a relatively accurate guidance of the flange 3 on the part 1 in a loose configuration.

Such an arrangement further allows providing a better accessibility to the locking mechanism 30, at a distance from the body 4 of the flange 3, which facilitates the mounting on the support 2, and eliminates, during the handling of the subassembly and of the fastening on the support 2, any risk of accidental interference with the snap-fit members 20, 21, and in particular any risk of accidental release and opening of the flange 3.

Nevertheless, any other arrangement of the relative position of the snap-fit 20, 21 and locking 30 members might be envisaged, depending in particular on the space available for installing the flange 3 and the subassembly 10 within the support 2.

Thus, for example, it might be envisaged that the snap-fit members 20, 21 and the locking mechanism 30 (and more particularly the through holes 31, 32) are substantially at the same distance radially from the central axis (XX'), or that the locking mechanism 30 (and more particularly the through holes 31, 32) are substantially closer to the central axis (XX') than the snap-fit members 20, 21.

According to a preferred variant, the flange 3 includes a first lug 5 and a second lug 6 which are formed of polymer material, preferably in one piece with the body 4, and which have, as aforementioned, a locking mechanism 30, which includes a first through hole 31 in the first lug 5 and a second through hole 32 in the second lug 6, said through holes 31, 32 being superimposed to allow the passage of a fastening element 33, such as a screw, a stud or a rivet, during the fastening of said lugs 5, 6 on the support 2.

According to this preferred variant, and according to a feature which may constitute a full-fledged invention, one of said lugs 5, 6 further has, as shown in particular in FIGS. 1, 2, 4, 8 and 10, a preferably oblong metal reinforcing barrel 34, which extends opposite the inner walls of the first and second through holes 31, 32, so as to form a reinforcing spacer which limits the creep of the polymer material of the lugs 5, 6 during the tightening of the fastening element 33 against the support 2.

The height H34 of said reinforcing barrel 34, considered along the longitudinal axis of the fastening element 33, will be dimensioned such that the reinforcing barrel 34 may withstand the compressive crushing exerted by the fastening element 33, and thus avoiding a creep of the plastic lugs 5, 6 (and thus in fine a damaging and a loosening of the fastening to the support 2), without, however, hindering the tightening.

Thus, according to a first variant, according to which, in order to obtain the tight configuration, the lugs 5, 6 must be juxtaposed against each other, that is to say the residual spacing must be reduced to zero, as illustrated in FIG. 10, then the height H34 of said reinforcing barrel 34 will be slightly smaller than the cumulative height (at rest) of the two through holes 31, 32, that is to say here the cumulative thickness E5+E6 of the first and second lugs 5, 6.

More particularly, the height H34 of the reinforcing barrel 34 may be such that, when the lugs 5, 6 are juxtaposed to one another, the reinforcing barrel 34 is just flush or slightly re-entrant, so that the free edge (here upper edge in FIG. 10) is set back from 0 mm to 0.2 mm from the surface (here upper surface) of the first lug 5, that is to say so that the limit of said barrel 34 is set back from 0 mm to 0.2 mm from the cumulative height E5+E6 of the through holes 31, 32.

According to this first variant, during the mounting step (b), the fastening element 33, and more particularly the screw head, might be progressively tightened until it bears (in compression) against the free edge of the reinforcing barrel 34 which stops the tightening movement.

Of course, if said reinforcing barrel is re-entrant, the tightening might be accompanied by a slight deformation of the lugs 5, 6 by compressive crushing in the direction of their thickness, since the fastening element 33, and more particularly the screw head, bears on the face (here upper face) of the first lug 5, until said upper face of the first lug 5 is brought to the same level as the edge of the reinforcing barrel 34, while the face (here lower face) of the second lug 6 is blocked by bearing against the support 2.

The compressive deformation rate of the lugs 5, 6 will however be limited to the difference between the height 34 of the barrel and the cumulative thickness (at rest) E5+E6 of the lugs.

According to a second variant, according to which the tight configuration is obtained by bringing the lugs 5, 6 together, but without the need to juxtapose said lugs 5,6 against each other, that is to say a variant in which, in the tight configuration, a non-zero residual (final) spacing d1 remains between said lugs 5, 6, then the height H34 of said reinforcing barrel 34 may be greater than the cumulative thickness E5+E6 of the first and second lugs 5, 6, that is to say the barrel 34 will be potentially <<protruding>>, in that if the first lug 5 is closed at vacuum contact with the second lug 6, that is to say in the absence of a mechanical part 1 in the flange body 4, then the edge of the barrel 34 would protrude relative to the upper face of the first lug 5.

In all cases, in the tight configuration, the upper face of the first lug 5, against which bears the fastening element 33, will be at the same level as the edge of the barrel 34, such that the height H34 of said barrel 34 allows to accurately define the degree of tightening of the flange 3 which corresponds to the tight configuration (that is to say define the position of the lugs 5, 6 which corresponds to the second degree of closure).

According to a preferred feature which may constitute a full-fledged invention, and as clearly shown in particular in FIGS. 1 to 9, the first segment 11 of the mechanical part 1 comprises at least one first stop 12 formed by an annular rib or an annular rib portion, which protrudes which protrudes radially toward the outside of the first segment 11, substantially in a plane normal to the central axis (XX'), on the one hand to limit the translation T3 of the flange 3 along the central axis (XX') and on the other hand to guide the rotation R3 of the flange about said central axis (XX').

It will be noted that this feature may be common to different variants of the subassembly 10, in particular those illustrated in FIG. 1.

Such an annular stop 12 advantageously forms a stop and guide male member, protruding on the radially outer surface of the first segment 11.

Preferably, and for convenience of manufacture, said first stop 12 will be formed in one piece with the part 1, for example by injection molding, or by extrusion blow-molding.

According to a preferred feature which may constitute a full-fledged invention and which is found in a second variant illustrated in FIGS. 1 to 10, the first segment 11 of the mechanical part 1 comprises, in addition to the aforementioned first stop 12 (annular rib or annular rib portion), a second stop 13, distinct and axially distant from the first stop 12, and which is formed by an annular rib, or an annular rib portion which protrudes radially towards the outside of the first segment 11, substantially in a plane normal to the central axis (XX').

Advantageously, said second stop 13 is arranged, on the one hand, to limit the translation T3 of the flange 3 along the central axis (XX') in a direction opposite to the first stop 12.

In a particularly preferred manner, said second stop 13 is also arranged, on the other hand, to be (also) able to guide the rotation R3 of the flange 3 about said central axis (XX').

According to this second variant, the body 4 of the flange 3 is thus placed axially between the first stop 12 and the second stop 13, which thus make the flange axially captive of the first segment 11.

It is then the side edges 114, 115 of said body 4, which axially delimit said body 4, which form respectively the left bearing member 114, which cooperates with the first stop 12 and the right bearing member 115, which cooperates with the second stop 13.

Preferably, the at least one of the first and second annular stops 12, 13 is interrupted on an angular sector 41 which defines the displacement range allowed in rotation R3 of the flange 3 about the central axis (XX'), and the body 4 of the flange 3 comprises a bearing member 116, 117 formed by a finger 42 which protrudes axially inside said angular sector 41, as shown in particular in FIGS. 3, 5 to 9.

The finger 42 is preferably formed in one piece with the body 4 of the flange 3, and more particularly with the jaw (here upper jaw) 4A, protruding axially on the edge of said body 4.

Advantageously, the stop (here the first stop) 12 which cooperates with the finger 42 forms both a stop in translation and an angular stop in (azimuthal) rotation.

The corresponding bearing members (in rotation) 116, 117 are here formed by the azimuthal edges which delimit angularly the finger 42 about the central axis (XX').

Figure 2:
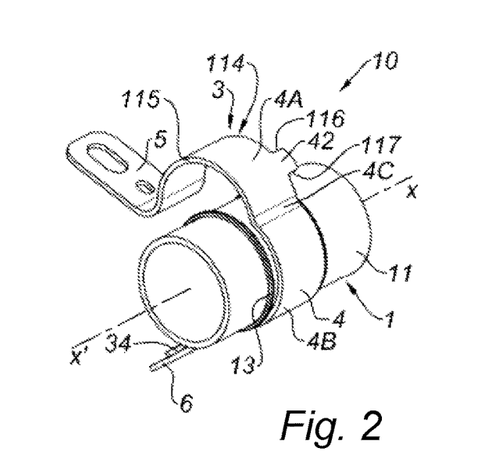
FIG. 2, illustrates, in a back perspective view, the engagement of the flange on the conduit of the subassembly of FIG. 1.
Figure 3:
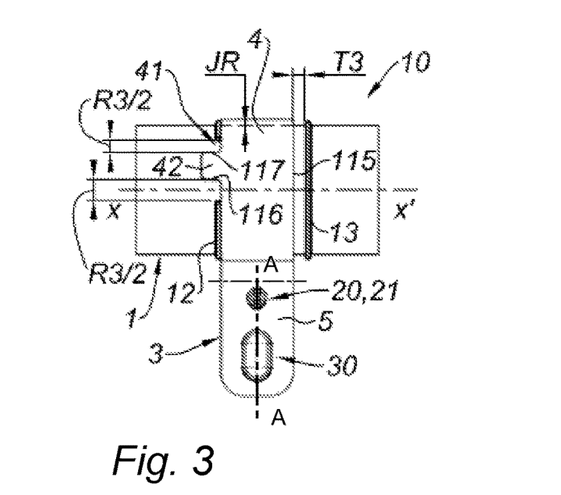
FIG. 3 illustrates, in a top projection view, the subassembly of FIGS. 1 and 2 in a loose configuration, with the captive flange of the conduit.

By way of example, in order to obtain both a robust stop, therefore sufficiently wide, and a sufficient stroke in rotation (corresponding to the aforementioned displacement range allowed in rotation R3), the angular sector 41 of interrupting the first stop 12 might preferably extend over 45 degrees to 90 degrees, about the central axis (XX'), and preferably over about 60 degrees as it is the case in FIGS. 1 to 10, while the finger 42 will cover, from the first azimuthal edge 116 to the second azimuthal edge 117, between 15 degrees and 45 degrees, and preferably about 20 degrees to 30 degrees, as illustrated in FIG. 2, so as to allow an angular adjustment in rotation R3 of about 30 degrees.

Moreover, it will be possible to provide, in order to improve the damping of specific vibrations, a damping pad made of elastomer which, once the flange 3 is in a tight configuration, will be interposed, and compressed radially, between the inner face of the body 4 of the flange and the outer face of the first segment 11.

To this end, a first solution may consist firstly in threading an elastomer ring, forming a damper, on the first segment 11, then in engaging the flange 3 in a loose configuration on the first segment 11 (and therefore in a loose configuration about the elastomer ring) in order to constitute the subassembly 10.

A second solution may consist in directly producing a flange 3, and more particularly a bi-layer flange body 4, for example by co-injection or co-extrusion, such that said body 4 will comprise a radially outer layer made of rigid thermoplastic polymer, as described above, forming an armature and an elastomer-made or an elastomer-based radially inner layer (for example, a copolymer mixing elastomer and more rigid thermoplastic polymer), forming a damper, said radially inner layer being arranged to come into tight contact with the outer face of the first segment 11 in a tight configuration.

In any case, regardless of the retained solution, the dumper pad made of elastomer will be arranged so that, in the loose configuration, that is to say as long as the locking mechanism 30 has not been actuated and therefore as long as there is no tightening of the flange 3 on the support 2 and on the part 1, there is always a play, and more particularly a radial play JR, between the body 4 of the flange 3 and the first segment 11 (if necessary between the body 4 of the flange 3 and the elastomer ring which partly covers said first segment 11), as well as a functional assembly of stops 12, 13 and of bearing members 114, 115, 116, 117 as described above, in order to allow a free adjustment of the position of the flange 3 relative to the part 1.

However, according to a preferred embodiment, and in particular regardless of the variant envisaged for the arrangement of the stops 12, 13 and of the bearing members 114, 115, 116, 117, the body 4 of the flange 3 may be devoid of an elastomer pad configured to be tightened against the first segment 11 of the mechanical part 1.

Advantageously, the flange 3 may thus possess a very simple structure, preferably in one piece, made of rigid polymer material.

Furthermore, the absence of an elastomer pad interposed between the inner face of the flange 3 and the outer face of the first segment 11 prevents the flange from excessively rubbing on the part 1 in the loose configuration, which allows an adjustment in an easy and fast position without risk of damaging the flange 3 or the part 1.

In addition, to the extent that the tightening of the flange 3, that is to say the reduction of the inner diameter of the body 4 during the locking on the support 2, is not compensated by an elastic crushing of an elastomer pad, the invention also allows to obtain a relatively strong tightening of the flange 3 on the part 1 with a small tightening stroke, that is to say in a few screwing movements of the fastening element 33, since it is sufficient to scan (at most) the residual crushing d1 which separates the lugs 5, 6 in the loose configuration and which is relatively small.

Finally, the inventors have found that, by appropriately arranging and dimensioning the lugs 5, 6 made of polymer, and in particular by using lugs 5, 6 of adequate thicknesses, said lugs 5, 6 made of polymer could advantageously act substantially as a damping springboard promoting the attenuation of the vibrations between the part 1 and the support 2, without the need for an additional elastomer pad.

Of course, the invention also concerns as such a subassembly 10 according to any one of the variants envisaged above.

In particular, the invention thus concerns a subassembly 10 comprising a mechanical part 1, such as a duct, as well as a fastening flange 3 which comprises a body 4 surrounding said mechanical part 1, as well as at least one lug 5, 6 supporting the body 4 and configured to be fastened on a support 2 distinct from the subassembly 10, such as a vehicle engine or chassis, subassembly 10 within which:

said flange 3 is placed on a first segment 11 of the mechanical part which extends along a central axis (XX'), in a configuration called «loose configuration» in which, on the one hand, the flange 3 is captive of the mechanical part 1 and, on the other hand, a play JR exists between the body 4 of the fastening flange and the first segment 11 so that said flange 3 can be displaced in at least one degree of freedom relative to the first segment, in rotation about the central axis (XX') and/or in translation along said central axis (XX'), the first segment 11 is provided with at least one stop 12, 13, and the fastening flange 3 of at least one bearing member 114, 115, 116, 117 designed to cooperate with the stop 12, 13 so as to limit, in the loose configuration, the stroke of the fastening flange 3 relative to the first segment 11, according to the at least one degree of freedom, to a predetermined allowed displacement range R3, T3 which allows to freely select a position of the flange relative to the first segment, called «adapted position» PA, among a plurality of accessible positions, and the flange comprises a locking mechanism 30 arranged such that, if the subassembly 10 is fastened (and thus, when the subassembly is fastened) to the support 2 by means of the at least one lug 5, 6 of the fastening flange, after having positioned the fastening flange 3 in the adapted position PA, then the action of fastening the at least one lug 5, 6 to the support 2 automatically causes a locking of the body 4 of the fastening flange on the mechanical part 1, in a configuration called «tight configuration» in which said fastening flange 3 is immobilized on the first segment 11 in the selected adapted position PA.

The invention also concerns a vehicle, and more particularly a motor vehicle, equipped with a subassembly 10 according to the invention, whose at least one lug 5, 6 of the fastening flange 3 is tightened against a support 2 formed by the engine of said vehicle (in particular the engine configured for the propulsion of the vehicle) or the chassis of said vehicle by means of a fastening element 33, of the screw, stud or rivet type, which maintains at the same time the flange 3 in its tight configuration on the mechanical part 1.

Preferably, said subassembly 10 comprises a mechanical part 1 formed by a conduit configured for the passage of a fluid, and therefore is part of a fluid circuit (preferably onboard the vehicle), such as an air intake circuit, a fuel intake circuit, an exhaust circuit, a gas or vapor transfer circuit, in particular for the collection of oil vapors, brake fluid, coolant, urea depollution, etc.

Of course, the invention is in no way limited to the only variants described in the foregoing, those skilled in the art being in particular likely to isolate or freely combine together one or other of the aforementioned features, or to substitute them with an equivalent.

The invention claimed is:

1. A fastening method for fastening a mechanical part on a support by a fastening flange which comprises a body configured to receive and hold the mechanical part, as well as at least one lug supporting the body and configured to be fastened on the support, the method comprising a preparation step (a) of preparing a subassembly including at least one mechanical part and at least one fastening flange, where the preparation step (a) includes:
   placing the fastening flange on a first segment of the mechanical part which extends along a central axis, in a loose configuration in which, (i) the fastening flange is captive of the mechanical part and, (ii) a play exists between the body of the fastening flange and the first segment so that the fastening flange may be displaced in at least one degree of freedom relative to the first segment, in rotation about the central axis or in translation along the central axis,
   providing on the first segment at least one stop, and on the fastening flange at least one bearing member, designed to cooperate with the stop so as to limit, in the loose configuration, a stroke of the fastening flange relative to the first segment, in the at least one degree of freedom, to a predetermined allowed displacement range which allows to freely select an adapted position of the fastening flange relative to the first segment among a plurality of accessible positions,
   providing on the fastening flange a locking mechanism arranged such that, if subsequently to the preparation step (a), the subassembly is fastened to the support by the at least one lug of the fastening flange, after having positioned the fastening flange in the adapted position, then fastening of the at least one lug to the support automatically causes a locking of the body of the fastening flange on the mechanical part, in a tight configuration in which the fastening flange is immobilized on the first segment in the selected adapted position,
   limiting the translation of the fastening flange along the central axis and guiding the rotation of the fastening flange about the central axis by a first stop and a second stop each formed by an annular rib or an annular rib portion, which protrudes radially outside of the first segment, substantially in a plane normal to the central axis,
   interrupting at least one of the first and second stops on an angular sector, which defines the displacement range which is allowed in rotation of the fastening flange about the central axis, and the body of the fastening flange comprises a bearing member formed by a finger which protrudes axially inside the angular sector.

2. The method according to claim 1, wherein, further comprising a mounting step (b) after the preparation step (a), wherein during the mounting step (b), the subassembly is positioned relative to the support, the position of the fastening flange is adjusted to reach the adapted position, then the at least one lug of the fastening flange is fastened on the support, to simultaneously fasten the subassembly to the support and lock the fastening flange on the first segment of the mechanical part of the subassembly.

3. The method according to claim 1, wherein, in the loose configuration, the fastening flange has a displacement range allowed in rotation about the central axis which is greater than or equal to 2 degrees, and less than or equal to 60 degrees.

4. The method according to claim 1, wherein, in the loose configuration, the fastening flange has a displacement range allowed in translation along the central axis which is greater than or equal to 2 mm, and less than or equal to 50 mm.

5. The method according to claim 1, wherein the body of the fastening flange is devoid of an elastomer pad configured to be tightened against the first segment of the mechanical part.

6. The method according to claim 1, wherein the fastening flange includes a first lug and a second lug which include, on the one hand, pre-holding members, which allow bringing the first lug and the second lug together in a first degree of closure which corresponds to the loose configuration and, on the other hand, a locking mechanism which includes a first through hole in the first lug and a second through hole in the second lug, the through holes being superimposed in order to allow the passage of a fastening element during the fastening of the lugs on the support such that, when the fastening element is tightened against the support, the first lug and the second leg are automatically brought together in a second degree of closure which corresponds to the tight configuration.

7. The method according to claim 1, wherein the fastening flange includes a first lug and a second lug which are formed of a polymer material and which have a locking mechanism which includes a first through hole in the first lug and a second through hole in the second lug, the through holes being superimposed in order to allow the passage of a fastening element during the fastening of the lugs on the support, and one of the lugs further has a metal reinforcing barrel which extends opposite the inner walls of the first and second through holes, so as to form a reinforcing spacer which limits the creep of the polymer material of the lugs during the tightening of the fastening element against the support.

8. The method according to claim 1, wherein, in the loose configuration, the fastening flange has a displacement range allowed in rotation about the central axis which is greater than or equal to 2 degrees, and less than or equal to 30 degrees.

9. The method according to claim 1, wherein, in the loose configuration, the fastening flange has a displacement range allowed in translation along the central axis which is greater than or equal to 2 mm, and less than or equal to 20 mm.

10. A subassembly comprising a mechanical part as well as a fastening flange which comprises a body surrounding the mechanical part, as well as at least one lug supporting the body and configured to be fastened on a support distinct from the subassembly,
   wherein the fastening flange is placed on a first segment of the mechanical part, which extends along a central axis, according to a loose configuration in which, (i) the fastening flange is captive of the mechanical part and, (ii) a play exists between the body of the fastening flange and the first segment so that the fastening flange can be displaced in at least one degree of freedom relative to the first segment, in rotation about the central axis or in translation along the central axis,
   the first segment is provided with at least a first stop and a second stop each formed by an annular rib, or an annular rib portion, which protrudes radially towards the outside of the first segment, substantially in a plane normal to the central axis, to limit the translation of the fastening flange along the central axis and to guide the rotation of the fastening flange about the central axis,
   wherein the fastening flange comprises at least one bearing member, designed to cooperate with at least one of the first and second stops so as to limit, in the loose configuration, a stroke of the fastening flange relative to the first segment, in the at least one degree of freedom, to a predetermined allowed displacement range which allows to freely select an adapted position of the fastening flange relative to the first segment among a plurality of accessible positions, and wherein the fastening flange comprises a locking mechanism arranged such that, if the subassembly is fastened to the support by the at least one lug of the fastening flange, after having positioned the fastening flange in the adapted position, then fastening of the at least one lug to the support automatically causes a locking of the body of the fastening flange on the mechanical part, in a tight configuration in which the fastening flange is immobilized on the first segment in the selected adapted position and at least one of the first and second annular stops is interrupted on an angular sector which defines the displacement range allowed in rotation of the fastening flange about the central axis, and the body of the fastening flange comprises a bearing member formed by a finger which protrudes axially inside the angular sector.

11. A vehicle equipped with a subassembly according to claim 10, wherein the at least one lug of the fastening flange is tightened against a support formed by an engine or a chassis of the vehicle by a fastening element of a screw, stud or rivet type, which maintains simultaneously the fastening flange in its tight configuration on the mechanical part.

* * * * *